US010432994B2

(12) United States Patent
Grover

(10) Patent No.: US 10,432,994 B2
(45) Date of Patent: Oct. 1, 2019

(54) CONTENT COMPARISON TESTING ON LINEAR MEDIA STREAMS

(71) Applicant: The Nielsen Company (US), LLC, New York, NY (US)

(72) Inventor: Matthew Grover, Cardiff (GB)

(73) Assignee: The Nielsen Company (US), LLC, New York, NY (US)

(*) Notice: Subject to any disclaimer, the term of this patent is extended or adjusted under 35 U.S.C. 154(b) by 0 days.

(21) Appl. No.: 15/164,714

(22) Filed: May 25, 2016

(65) Prior Publication Data

US 2017/0238037 A1    Aug. 17, 2017

Related U.S. Application Data

(60) Provisional application No. 62/296,513, filed on Feb. 17, 2016.

(51) Int. Cl.
*H04N 21/266* (2011.01)
*H04N 21/2668* (2011.01)
(Continued)

(52) U.S. Cl.
CPC ... *H04N 21/2668* (2013.01); *H04N 21/23418* (2013.01); *H04N 21/2407* (2013.01);
(Continued)

(58) Field of Classification Search
CPC .. H04N 21/258; H04N 21/442; H04N 21/472; H04N 21/6405; H04N 21/81;
(Continued)

(56) References Cited

U.S. PATENT DOCUMENTS 6,505,169 B1 *  1/2003  Bhagavath ............. G06Q 30/02
                                                        705/14.66
8,908,573 B1 * 12/2014  Wang ........................ H04L 5/26
                                                        370/280
(Continued)

FOREIGN PATENT DOCUMENTS

WO    2014/092811 A1    6/2014

OTHER PUBLICATIONS

International Search Report dated Apr. 13, 2017, issued in connection with International Application No. PCT/US2017/016666, 2 pages.
(Continued)

*Primary Examiner* — Nicholas T Corbo
(74) *Attorney, Agent, or Firm* — McDonnell Boehnen Hulbert & Berghoff LLP

(57) ABSTRACT

A method is disclosed to include receiving first viewership information for a media segment displayed on a first electronic device, the first viewership information including a first viewership event associated with the media segment, where media content includes at least the media segment. The method can include receiving second viewership information for an overlay content segment displayed on a second electronic device, the second viewership information comprising a second viewership event associated with the overlay content segment. The method can include determining that a first viewership level for the overlay content segment is greater than a second viewership level for the media segment in view of the first viewership event or the second viewership event. The method can include sending a display instruction to a content management device instructing the content management device to send the overlay content segment to the first electronic device and the second electronic device.

20 Claims, 5 Drawing Sheets

(51) Int. Cl.
*H04N 21/234* (2011.01)
*H04N 21/24* (2011.01)
*H04N 21/438* (2011.01)
*H04N 21/442* (2011.01)
*H04N 21/443* (2011.01)
*H04N 21/472* (2011.01)
*H04N 21/81* (2011.01)
*H04N 21/8352* (2011.01)

(52) U.S. Cl.
CPC ....... *H04N 21/4383* (2013.01); *H04N 21/443* (2013.01); *H04N 21/44218* (2013.01); *H04N 21/47217* (2013.01); *H04N 21/812* (2013.01); *H04N 21/8352* (2013.01)

(58) Field of Classification Search
CPC ......... H04N 21/23418; H04N 21/2407; H04N 21/2668; H04N 21/4383; H04N 21/44218; H04N 21/443; H04N 21/47217; H04N 21/812; H04N 21/8352
USPC .............................. 725/9, 14, 34, 35, 46, 47
See application file for complete search history.

(56) References Cited

U.S. PATENT DOCUMENTS 9,113,195 B1 * 8/2015 Barton ................ H04N 21/435

| | | | |
|---|---|---|---|
| 2002/0078441 A1 * | 6/2002 | Drake | H04N 7/17318 725/9 |
| 2003/0172381 A1 * | 9/2003 | Janevski | H04N 7/163 725/46 |
| 2004/0073924 A1 * | 4/2004 | Pendakur | H04H 60/06 725/46 |
| 2007/0157220 A1 * | 7/2007 | Cordray | H04H 60/65 725/9 |
| 2007/0271145 A1 * | 11/2007 | Vest | G06Q 30/02 705/14.41 |
| 2010/0306808 A1 * | 12/2010 | Neumeier | H04N 5/44591 725/105 |
| 2013/0205317 A1 * | 8/2013 | Sinha | G06T 1/0021 725/14 |
| 2014/0049651 A1 * | 2/2014 | Voth | H04N 5/44 348/189 |
| 2014/0282670 A1 * | 9/2014 | Sinha | H04N 60/40 725/19 |
| 2016/0094994 A1 * | 3/2016 | Kirkby | G06K 9/00711 380/270 |
| 2016/0286283 A1 * | 9/2016 | Oku | G06K 9/00221 |
| 2017/0026718 A1 * | 1/2017 | Yabu | H04N 21/8352 |

OTHER PUBLICATIONS

Witten Opinion dated Apr. 13, 2017, issued in connection with International Application No. PCT/US2017/016666, 15 pages.

* cited by examiner

CONTENT COMPARISON TESTING ON LINEAR MEDIA STREAMS

This application claims the benefit of U.S. Provisional Application No. 62/296,513, filed Feb. 17, 2016, the entire disclosure of which is incorporated herein by this reference.

BACKGROUND

Electronic devices, such as smartphones, tablets, and smart televisions (TVs), can access digital content and receive data, such as streaming media, from data networks (such as the Internet). Streaming media refers to a service in which media content can be provided to an end user (upon request) over a telephone line, a cable, the Internet, and so forth. For example, a user can view a movie without having to leave their residence by requesting the movie via an electronic device and viewing the movie as it is streamed over the Internet. In another example, users can access various types of educational content, such as video lectures, without having to physically attend a school or an educational institution.

As the number of electronic devices continues to increase, media content generation and delivery can similarly increase. With an increase in the use of electronic devices to access streaming media, content providers or network providers can distribute contextually-relevant material to viewers that are consuming streaming media. For example, local broadcasters can integrate contextually-relevant advertisements and interactive content with streaming media.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

Figure 1:
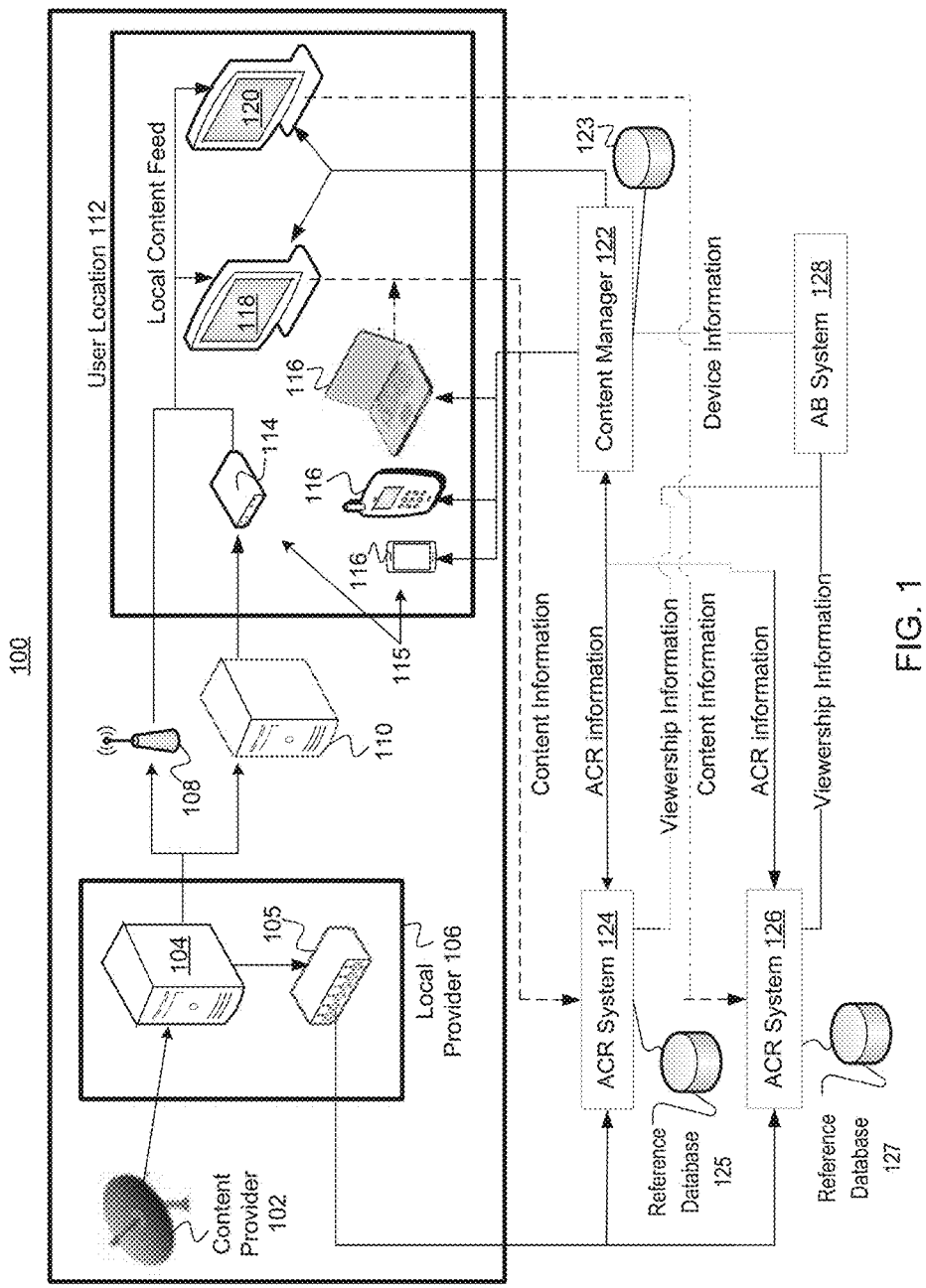
FIG. 1 illustrates a system diagram of a content distribution network according to one embodiment

Currently, there are several hundred program choices offered by cable television (TV) providers and satellite providers. In addition, there are over one hundred major television market areas with dozens of local television channels. A content provider or broadcaster may generate content feeds at a central location and distribute the content feeds to a variety of locations. For example, a content provider may distribute a television channel to a number of network providers. The network providers can be local broadcasters, multi-channel networks, and other content owners or distributors.

The word "content" can refer to media or multimedia. The word "content" can also be a specific term that means the subject matter of the medium rather than the medium itself. Likewise, the word "media" and some compound words that include "media" (e.g. multimedia or hypermedia) are instead referring to content, rather than to the channel through which the information is delivered to the end user/audience. An example of a type of content commonly referred to as a type of media is a "motion picture," referred to as "a film." Another example is a "video," which typically includes video frames and audio samples.

Media content broadcasting or streaming, such as TV show or internet broadcast, may be an engaging venue to advertise products and services, provide information to viewers, or any combination thereof. To create revenue to provide numerous programming choices, content providers (such as television networks) can insert advertisements (ADs) into media content. Conventionally, advertisers have relied on sending one stream of media content to all the viewers of a channel, with the local broadcasters only targeting viewers based on an audience analysis and ratings providers, such as ratings provided by The Nielsen Company®.

While TV advertising is an engaging venue to advertise products or services, traditional TV advertising lacks ADs that are targeted and personalized for different viewers. Automatic content recognition (ACR) systems can use fingerprinting to identify media content and provide viewers with targeted and/or personalized advertising. For example, an ACR system can identify media content using content fingerprinting.

Additionally, conventional advertising lacks an ability to target and personalize ADs for specific viewers or groups of viewers. For example, to reach a viewer with a TV AD, conventional TV advertising assumes a viewer prefers a first TV AD that is selected by a content provider or advertiser over a second TV AD. In this example, the content provider or the advertiser will show the first TV AD at a scheduled time during a content broadcast. However, this assumption is often incorrect. For example, when the first TV AD is undesirable to the viewer, the viewer may not watch the TV AD at all or stop viewing the TV AD part of the way through the TV AD. In another example, when the first TV AD is undesirable to the viewer, the TV AD can have a negligible effect on the viewer's intent to purchase a product shown in the TV AD. It is therefore advantageous to determine which TV AD a viewer may prefer among multiple TV ADs.

Described herein are methods, systems, and devices for testing which media segment or overlay content segment from among multiple segments is preferred by a viewer. To make this determination of which media segment or overlay content segment is preferred by the viewer, comparison testing can be used to display different media segments and overlay content segments to viewers. The performance of the media segments and overlay content segments is measured during the test, and the higher performing segment can be selected for displaying to the viewer. Different testing schemes can be used for the comparison testing, such as A/B testing, split testing, and multivariate testing. For example, A/B testing can include preparing two versions of media content, such as the media content with two different ADs, where the ADs include different elements with differing structures. The two different ADs can be separately displayed to different viewers.

One advantage of comparison testing multiple media segments and overlay content segments can be to identify and display overlay content segments to viewers that are tailored to a context of the content broadcast and an interest of the viewer. An overlay content segment can be a segment or portion of audio content, video content, textual content, graphical content, or interactive content that can be overlayed onto media content from a content provider or broadcaster.

Another advantage of comparison testing of multiple overlay content segments is to determine an efficacy of different elements or portions of overlay content segments. For example, overlay content segments can have different elements including textual elements, graphical elements, audio elements, video elements, interactive elements, and so forth. The different elements of overlay content segments can influence the efficacy of the overlay content segments and a rate at which viewers will perform desired actions. Desired actions can include purchasing a product or a service shown in the overlay content segment, visiting a website for the product or the service, sharing the overlay content segment with others (such as via social media), watching the media content, and so forth.

FIG. 1 illustrates a system diagram of a content distribution network 100 according to one embodiment. In the content distribution network 100, a content provider 102 may broadcast a content feed to a local provider 106. The local provider 106 may include a headend 104 and an ACR fingerprinter server 105. The headend 104 of the local provider 106 can receive a content feed from the content provider 102. The headend 104 may generate a local content feed based on the received content feed. For example, the headend 104 may be a local affiliate broadcaster receiving a network channel with programming and advertisements from a national or global broadcaster. In one example, the headend 104 can be a source of a broadcast feed prior to the broadcast facility transmitting the broadcast feed. In another example, the headend 104 can be a distribution amplifier. The distribution amplifier can receive a source feed and it can create multiple outputs for different devices from the same source feed. The output feeds can be routed to various distribution outlets, such as for broadcast over the air (OTA), delivery to cable providers, delivery to satellite providers, and/or delivery to online streaming providers.

The headend 104 may communicate the local content feed to the ACR fingerprinter server 105, an over-the-air (OTA) broadcaster 108, and/or a multichannel video programming distributor (MVPD) 110. In one example, the ACR fingerprinter server 105 can be a device that is installed in a broadcast facility. The ACR fingerprinter server 105 can receive a feed from the headend 104. The ACR fingerprinter server 105 can fingerprint the feed and send the fingerprints to a cloud-based web service. In one embodiment, the ACR fingerprinter server 105 may be installed inside the broadcast facility in order to fingerprint a feed in advance of that feed being delivered to a display device, such as a television (TV).

The OTA broadcaster 108 and/or the MVPD 110 may communicate the local content feed to electronic devices 115. Some examples of the electronic devices 115 include electronic devices 118 and 120, a set top box 114 that streams media content to the electronic devices 118 and 120, as well as other devices 116 through which the user may stream the local content feed, e.g., wirelessly. In one example, the electronic devices 115 can include displays (such as liquid crystal displays or touchscreen displays) to display information.

In one example, the OTA broadcaster 108 may broadcast the local content feed using traditional local television channels or radio channels. In this example, the electronic devices 118 and 120 may include antennas (such as TV antennas or radio antennas) to receive the local content feed. In another example, the MVPD 110 (such as a cable broadcaster or a satellite broadcaster) may communicate the local content feed to a set top box 114. In this example, the set top box 114 may format the content feed for the electronic devices 118 and 120 and may communicate the formatted content feed to the electronic devices 118 and 120. The electronic devices 118 and 120 may include a display device, such as a television screen or a touch screen, to display the local content to a viewer.

Various components of the content distribution network 100 may be integrated or coupled to the electronic devices 118 and 120. For example, the electronic devices 118 and 120 can be smart televisions. In one example, the smart TV can include the antennas, the set top box 114 or an integrated ACR system, and the display device in a single unit. In another example, the smart TV can include a processing device and radio frequency (RF) circuitry. The processing device can execute an operating system (OS) and/or one or more applications, such as applications to access video-on-demand (VOD) content. The processing device can use an antenna of the radio frequency (RF) circuitry to communicate on a wireless local area network (WLAN). In one example, the processing device can use the RF circuitry to connect to the internet to access online interactive media or on-demand streaming media.

The ACR fingerprint server 105 may analyze the local content feed and determine fingerprint information (e.g., fingerprints). The ACR fingerprint server 105 may communicate the fingerprints to the ACR system 124 or 126. The ACR systems 124 and 126 may be different ACR systems selected by device manufacturers, such as smart TV manufacturers. In one example, the ACR system 124 or 126 can include processing logic or a processing device to execute instructions or perform processes. In another example, the ACR systems 124 and 126 can be ACR web services for different ACR vendors.

The ACR fingerprint server 105 can enable the use of indexing clients from multiple ACR vendors. For example, different consumer electronics manufacturers (CEMs), such as TV manufactures, can independently select ACR vendors for integration into their electronic devices. To enable ACR-based functionality on a specific CEM's device, an ACR system can index broadcast feeds using ACR vendors CEMs have selected and integrated on that CEM's televisions. One advantage of integrating multiple ACR vendors onto the ACR fingerprinter server 105 can be to enable entities such as advertisers, advertising agencies, and content providers to interface with a single platform and deliver advanced advertising and content experiences to electronic devices from multiple CEMs.

In one example, the ACR system 124 can be coupled to a reference database 125. In another example, the ACR system 126 can be coupled to a reference database 127. The reference databases 125 and 127 can store fingerprints and media content. The ACR systems 124 and 126 can communicate viewership information to a content comparison system 128 (referred to herein as a AB system), as discussed in the proceeding paragraphs. The content management device 122 can communicate device information to the AB system 128, as discussed in the proceeding paragraphs. In one embodiment, the AB system 128 can include a processing device to execute instructions. In another embodiment, the AB system 128 can include processing logic that includes hardware (e.g., circuitry, dedicated logic, programmable logic, microcode, etc.), software (e.g., instructions executed by a processing device), firmware or a combination thereof.

The content management device 122 can be a server component that receives messages from the ACR system 124 and/or 126. The messages can include information indicating media content that the electronic device 118 or 120 is going to display or is currently displaying. In one example, in response to the content management device 122 receiving the message, the content management device 122 can record an impression or association between the electronic device 118 or 120 and the media content stored in the database 123. In another example, in response to the content management device 122 receiving the message, the content management device 122 can generate and submit a query or search of the database 123 for available overlay content for the media content.

The content management device 122 filters the overlay content using the device information for the electronic device 118 or 120. The content management device 122 can send an overlay content, via the ACR system 124 or 126, to the electronic device 118 or 120. In one embodiment, the electronic device 118 or 120 can display the overlay content to a viewer. In another embodiment, the electronic device 118 or 120 can replace the media content with the overlay content and display the overlay content to a viewer.

In one embodiment, the ACR system 124 or 126 can cause triggers to be displayed on the electronic device 118 or 120. The electronic device 118 or 120 can recognize the triggers and send a request to the content management device 122 to record an impression or association between the electronic device 118 or 120 and the media content in the database 123. For example, the electronic device 118 or 120 can send a request to the content management device 122 to record whether a viewer changes a channel when the electronic device 118 or 120 displays select media content.

The automatic content recognition may be performed in a distributed architecture as described herein. In one embodiment, an ACR system can reside on any of the electronic device 115, 118, or 120. In one embodiment, the ACR system can perform automatic content recognition. In another embodiment, a local ACR system or a local ACR fingerprint matcher integrated into the electronic device 115, 118, or 120 to perform the automatic content recognition. In another embodiment, the ACR system may perform ACR fingerprint matching as described herein. In another embodiment, the ACR system can be a client-side matching component.

The electronic devices 115, 118, or 120 can be a media device, such as a television, mobile phone, or dongle. The ACR system can be software or firmware that executes or runs on the electronic devices 115, 118, or 120. The ACR system can fingerprint media content (such as audio content, video content, closed captions, emergency messages, and so forth) during a playback of the media content. The ACR system can communicate with ACR system 124 or 126 to facilitate identification of content and trigger events to cause the content overlay system to perform dynamic ad replacement and/or superimposing overlay content on top of the media content. The proceeding paragraphs describe the interactions of the ACR system with the ACR fingerprint server 105 in greater detail.

The ACR fingerprint server 105 may analyze the local content feed that may include an ordered sequence of frames from the local content feed and capture fingerprints. The ACR fingerprint server 105 may communicate the fingerprints to the ACR system 124 or 126. The ACR systems 124 and 126 may be different ACR systems selected by device manufacturers, such as smart TV manufacturers. In one example, the ACR fingerprint server 105 may format fingerprints for the different ACR systems 124 and 126.

The ACR systems 124 and 126 may establish communication connections with the different electronic devices 115. The electronic devices 115 may communicate fingerprint information to the ACR systems 124 and 126, respectively. When the ACR system 124 or 126 receives ACR fingerprint information from the electronic devices 115, the ACR system 124 or 126 may match the received fingerprints with those generated by the ACR fingerprint server 105. When a match occurs and the ACR system 124 or 126 identifies content, the ACR system 124 or 126 may communicate ACR events to a content management device 122.

In another example, the ACR system 124 or 126 may receive ACR fingerprint information from one of the electronic devices 115 and may match the received fingerprints with those generated by the ACR fingerprint server 105. When a match occurs and the ACR system 124 or 126 identifies content, the ACR system 124 or 126 may notify the electronic device 115 of the ACR events. The electronic device 115 may communicate ACR event information to the content management device 122. Alternatively, or additionally, the ACR system 124 or 126 may directly communicate the ACR event information to the content management device 122. The ACR event information may include: information indicating the advertisements in the local content feed; information indicating selected or flagged content in the local content feed; or information indicating a change of a content channel at the electronic device 115 to new media content.

The ACR event information from the different ACR systems 124 and 126 may be in different formats and the content management device 122 may normalize the data into a common format. The content management device 122 can store the normalized data into a database 123. For example, the content management device 122 may receive disparate data sets from the ACR systems 124 and 126, the disparate data sets including similar but not identical data, such as data with the same content but formatted differently. The content management device 122 can process and reformat the disparate data sets to create a single data model or format (e.g., reformatted data sets). The content management device 122 can store the reformatted data sets in the database 123.

In one embodiment, to normalize disparate data sets from ACR systems 124 and 126, the content management device 122 may remove or filter data in the data sets. For example, some data sets may include fields or data that may be irrelevant to the content management device 122. In this example, the content management device 122 may remove or filter the irrelevant data. In another embodiment, to normalize the disparate data sets from the ACR systems 124 and 126, the content management device 122 may map fields in the data sets. For example, when the content management device 122 receives a first data set from the ACR system 124 and a second data set from the ACR system 126, at least some of the data fields of the first data set and the second data set may be common to both the first data set and second data set. However, the common data fields may be located at different places in the first data set and second data set. In this example, the content management device 122 may map the different data fields of the first data set and the second data set to normalized fields. When the content management device 122 maps the data fields, the same data fields are mapped to the same data field locations in the database 123.

In another embodiment, to normalize disparate data sets from the ACR systems 124 and 126, the content management device 122 may derive data from the data sets. For example, data from the ACR systems 124 and 126 may not include all of the fields that are needed to fill the data fields in the database. However, the content management device 122 may use other fields in the data sets from the ACR systems 124 and 126 to derive data for these data fields.

In one example, the database 123 may include data fields for a state in a country field, a designated market area (DMA) field, and a county and/or city field, but the data sets from the ACR systems 124 and 126 may only include zone improvement plan (ZIP) codes. In this example, the content management device 122 may use the ZIP codes to derive data for the fields in the database. In another example, the data set may not include any geographic location information, but may include an internet protocol (IP) address of the ACR systems 124 and 126. In this example, the content management device 122 may use a geo-IP lookup service to derive the state, DMA, county, city and ZIP code information.

In another example, the database 123 may include demographic fields such as an age field, a gender field, a household income field, and so forth. However, the data sets from the ACR systems 124 and 126 may not include the demographic fields or demographic data. In this example, the ACR systems 124 and 126 may provide the content management device 122 with the IP address of the electronic devices 115. The content management device 122 may use the IP addresses to determine the demographic data to populate the data fields in the database.

In another example, a field in a first data set from the ACR system 124 may include local time zone information, such as a mountain daylight time (MDT) zone, and a second data set from the ACR system 126 may include information from another time zone, such as a coordinated universal time (UTC) zone. The database may store all data using the UTC and the content management device 122 may convert the local time to UTC before storing the data in the database 123.

In one embodiment, the content management device 122 may use the normalized data to generate reports or data about user's viewing behavior (viewing data) across different ACR technology vendors and smart TVs or other Internet-connected video devices. The content management device 122 and the electronic devices 115 may include communication interfaces to communicate information, such as overlay content, between the electronic devices 115 and the content management device 122. In one example, the communication interface may communicate the information using a cellular network and/or a wireless network. In one example, the communication network may be a cellular network employing a third generation partnership project (3GPP) release 8, 9, 10, 11, or 12 or Institute of Electronics and Electrical Engineers, Inc. (IEEE®) 802.16p, 802.16n, 802.16m-2011, 802.16h-2010, 802.16j-2009, 802.16-2009. In another embodiment, the communication network may be a wireless network (such as a network using Wi-Fi® technology developed by the Wi-Fi Alliance) that may follow an IEEE® standard developed by the Institute of Electrical and Electronics Engineers, Inc., such as the IEEE 802.11-2012, IEEE 802.11ac, or IEEE 802.11ad standards. In another embodiment, the communication network may deploy Bluetooth® connections developed by the Bluetooth Special Interest Group (SIG) such as Bluetooth v1.0, Bluetooth v2.0, Bluetooth v3.0, or Bluetooth v4.0. In another embodiment, the communication network may be a ZigBee® connection developed by the ZigBee Alliance such as IEEE 802.15.4-2003 (Zigbee 2003), IEEE 802.15.4-2006 (Zigbee 2006), IEEE 802.15.4-2007 (Zigbee Pro).

In one example, the content management device 122 may instruct the electronic devices 115 to replace segments of the local content feed received from the OTA broadcaster 108 or the MVPD 110 with overlay content. In another example, the content management device 122 may instruct the electronic devices 115 to overlay or superimpose overlay content onto segments of the local content feed. The content management device 122 may aggregate ACR event information across multiple ACR systems 124 and 126 and may communicate overlay content to different electronic devices 115 (such as electronic devices from different device manufacturers).

The content management device 122 may also establish communication connections with other devices 116. In one example, the other devices 116 may communicate with the electronic devices 118 and 120 and provide an additional screen (e.g., a second screen) to display overlay content. For example, the electronic devices 118 and 120 may receive the local content feed from the OTA broadcaster 108 or the MVPD 110 and display the local content feed to a viewer. The other devices 116 may also communicate ACR event information to the ACR systems 124 and 126 when an ACR event occurs, as discussed in the preceding paragraphs. When the content management device 122 receives the ACR event information, the content management device 122 may communicate overlay content to the other devices 116.

In one example, the electronic devices 118 and 120 may continue to display the local content feed while the other devices 116 display the overlay content. In another example, the electronic devices 118 and 120 and the other devices 116 may both display the overlay content. In another example, the electronic devices 118 and 120 and the other devices 116 may display a segment of the overlay content and a segment of the local content feed. In another example, the electronic devices 118 and 120 and the other devices 116 may display different local content feeds and different overlay content.

In one example, the electronic devices 118 and 120 and/or the other devices 116 may display the overlay content at the time the electronic devices 118 and 120 and/or the other devices 116 receive the overlay content. In another example, the electronic devices 118 and 120 and/or the other devices 116 may delay displaying the overlay content for a threshold period of time. In one embodiment, the threshold period of time may be a predefined period of time. In another embodiment, the content management device 122 may select a period of time for the electronic devices 118 and 120 and the other devices 116 to delay displaying the overlay content.

Figure 2A:
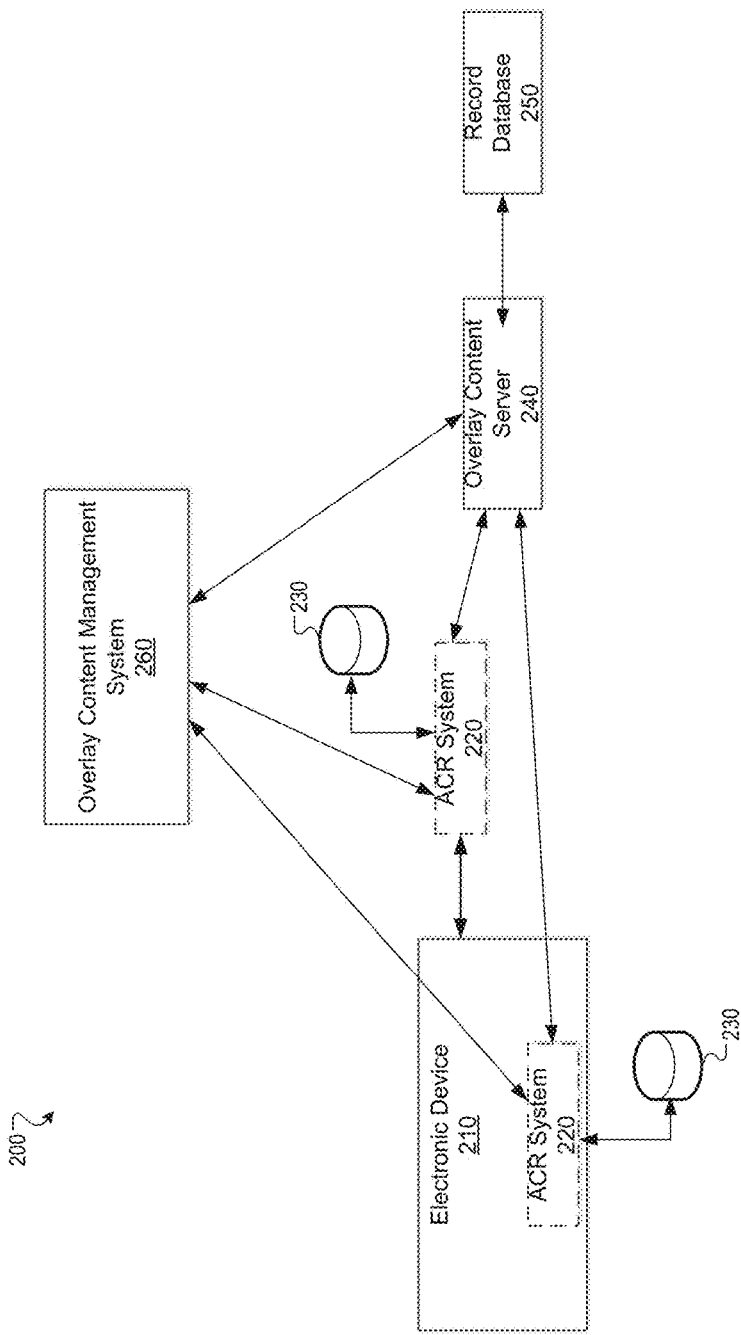
FIG. 2A illustrates a system diagram of a content overlay network according to one embodiment.

FIG. 2A illustrates a system diagram of a content overlay network 200 according to one embodiment. The content overlay network 200 can include an electronic device 210, a first ACR system 220, a content database 230, an overlay content server 240, a record database 250, and an overlay content management system 260. The ACR system 220 provides broadcast digital content to the electronic device 210. The broadcast digital content can include overlay content the ACR system 220 superimposes or overlays on top of media segments for the electronic device 210 to display to a viewer. A media segment can be a segment or portion of the media content. For example, the media segment can be a segment or portion of the media content for a TV show or a movie, such as a TV show clip or movie clip. In another example, the media segment of the media content can be a commercial that is part of the media content for the TV show or the movie.

In one embodiment, the ACR system 220 is integrated into the electronic device 210. In another embodiment, the ACR system 220 is coupled to the electronic device 210. In one example, the ACR system 220 can be directly coupled to the electronic device 210 using an input port of the electronic device 210. For example, the ACR system 220 is a High-Definition Media Interface (HDMI) dongle that plugs into an HDMI input terminal of the electronic device 210. In this example, the ACR system 220 can include an HDMI input port, an HDMI output port, and a network interface to receive broadcast content or media segments from a content provider. In another example, the ACR system 220 can be indirectly coupled to the electronic device 210 via another device that is coupled to the electronic device 210, such as an audio and/or video (A/V) device.

The electronic device 210 can use the ACR system 220 to display targeted or personalized overlay content segment to viewers. The overlay content segment can be an audio segment, a video segment, and/or a graphical segment of content. In one example, the overlay content segment can be a media object or file that includes an audio segment or a video segment of content that is a replacement AD. In another example, overlay content segment is an audio segment or video segment of a larger audio object or a larger video object that includes other overlay content segments.

In one embodiment, the ACR system 220 can use digital watermarking to ACR broadcast content. For digital watermarking, a content provider or a broadcaster can process the broadcast content to insert watermark data within a content signal prior to broadcast the content signal. The electronic device 210 or the ACR system 220 can detect the watermark data to identify and synchronize media segments with the broadcast content.

In another embodiment, the ACR system 220 can identify media content of the broadcast content, using content fingerprinting, as the electronic device displays the media content. The content fingerprinting can include the ACR system 220 matching a sequence of content fingerprints for media content the electronic device 210 is displaying with of stored fingerprints in a reference database. An advantage of content fingerprinting can be to process the media segment while the media segment is being broadcasted (e.g. live processing) or within a threshold period of time, such as several seconds, after the media segment is broadcast (e.g. substantially live processing). The content overlay network 200 can adjust overlay content segments, as the electronic device 210 displays the content, based on viewer behavior during a content broadcast (e.g. live or substantially live adjustments). In one example, the viewer behavior can include the electronic device 210 receiving a command from a user device to change a channel or to pause a display of media content. In another example, the viewer behavior can include the electronic device 210 receiving a command from the user device to display time-shifted content. As the viewers select or change the content, the content overlay network 200 can switch what overlay content is superimposed onto the media content.

The overlay content server 240 is coupled to the ACR system 220. The overlay content server 240 can receive overlay content from a content provider or advertiser. The overlay content server 240 can store media segments, overlay content segments, and format information for the media segments and overlay content segments. The overlay content server 240 can send media segments to the electronic device 210 in a select overlay format of the overlay formats.

The record database 250 is coupled to the overlay content server 240. The record database 250 can maintain a record of the media segments or overlay content segments that the electronic device 210 displays. In one embodiment, the electronic device 210 has a unique identifier (UID) associated with it that uniquely identifies the electronic device 210. The UID can also be associated with media segments or overlay content segments to indicate what media segments or overlay content segments the electronic device 210 has displayed.

In another embodiment, the record database 250 can receive a message from the overlay content server 240. In one example, the message can include a media segment ID that identifies a media segment and a UID that is associated with the media segment ID. In another example, the message can include an overlay content segment ID that identifies an overlay content segment and a UID that is associated with the overlay content segment ID. The record database 250 can store various media segment IDs and overlay content segment IDs with their associated UIDs for subsequent lookups by the overlay content server 240. The overlay content server 240 can search the record database 250 to determine when a media segment or overlay content segment associated with a respective media segment ID or overlay content segment ID has previously been displayed on the electronic device 210 with the UID.

In one embodiment, the overlay content management system 260 can include an input device to receive configuration information for a sequence of media segments and overlay content segments. In one example, the input device can be a software interface (such a web portal) on an electronic device, where a user can input configure information to configure the sequence of media segments and overlay content segments at the overlay content server 240. For example, the overlay content management system 260 can be an end-user accessible website for creating, viewing, updating, and deleting overlay content and replacement videos.

In one example, the user can use the input device to set rules or criteria for the overlay content server 240 to use to select an overlay content segment of an overlay content set. In one embodiment, the rules or criteria can include a sequence for displaying of items in an overlay content set, such as media content and overlay content segments. In another embodiment, the rules or criteria can include displaying different overlay content segments in view of demographic information of a user. In one example, when the user is a male, the electronic device 210 may display selected overlay content segments. In another example, when the user is a female, other overlay content segments may be displayed. In another embodiment, the rules or criteria can include displaying different overlay content segments in view of a time of day. For example, in the morning the electronic device 210 can display overlay content segments related to breakfast, in the evening the electronic device 210 can display overlay content segments related to dinner, and in the night time the electronic device 210 can display overlay content segments related to adult themes. In another embodiment, the overlay content server 240 can include an input device to receive configuration information to order media content and overlay content segments in a linear sequence. For example, a user can use a graphical user interface (GUI) to send configuration information to the overlay content server 240 to order the sequence of the media segments and overlay content segments.

Figure 2B:
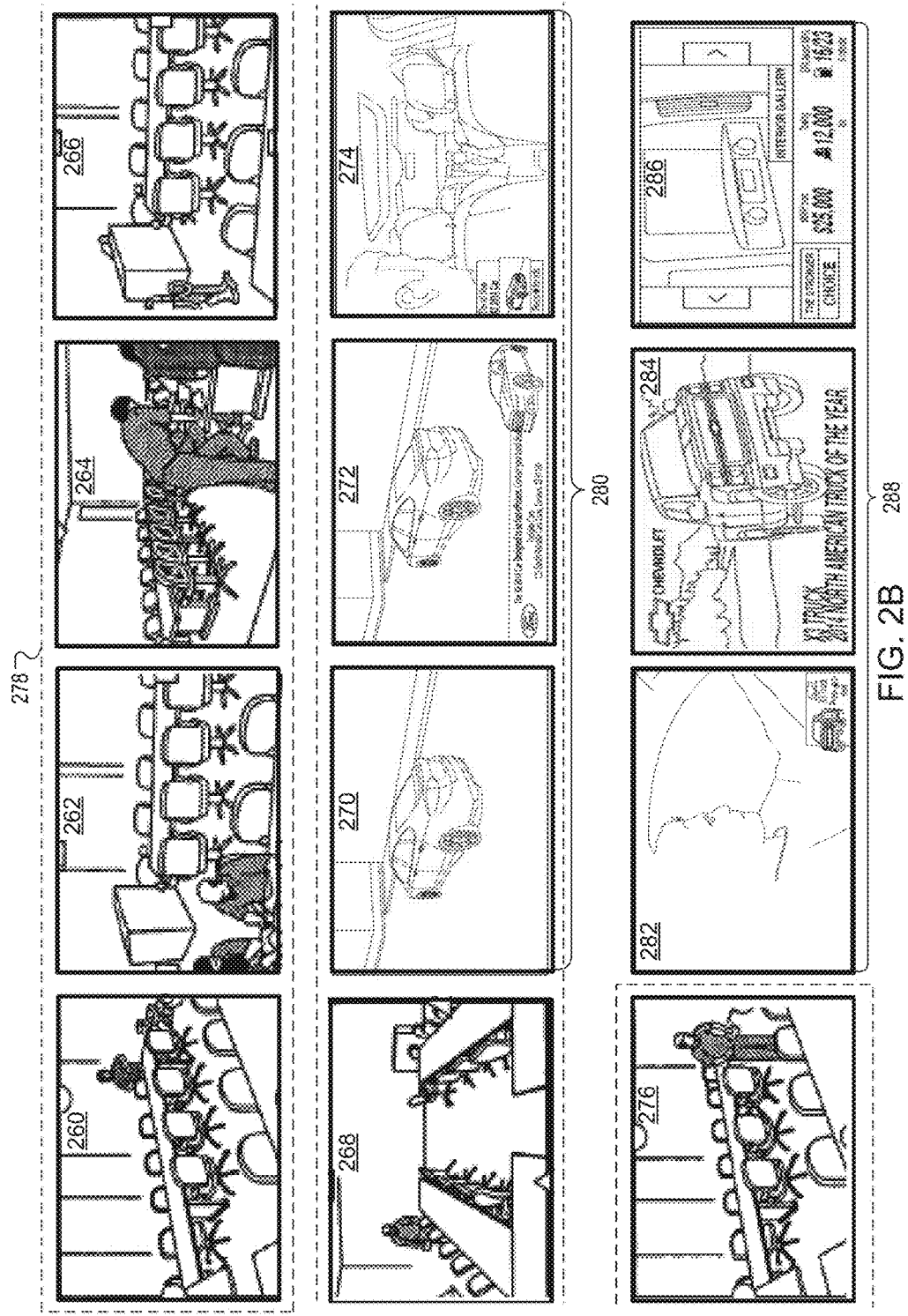
FIG. 2B illustrates media content with a media segment according to one embodiment.

FIG. 2B illustrates media content 278 with a media segment 280 according to one embodiment. Some numbers in FIG. 2B are similar to some numbers in FIG. 2A as noted by similar reference numbers, unless expressly described otherwise. In one embodiment, the ACR system 220 can use fingerprinting to identify the media content 278, as discussed in the preceding paragraphs. The media content 278 can include frames 260-276. Frames 270-274 can be the media segment 280 that is a segment of portion of the media content 278. In one embodiment, the frames 260-268 and 276 can be frames in the media content 278 that are part of a TV show or movie and the frames 270-274 and the frames 270-274 in the media segment 280 can be a commercial or AD that is integrated into the TV show or movie. In one example, the media segment 280 is a commercial that is integrated into a TV show or movie which is broadcast or streamed to the electronic device 210. In another example, the media segment 280 can be a segment or portion of the TV show or a movie, such as a TV show clip or movie clip.

In another embodiment, the overlay content server 240 can determine that the media segment 280 was previously displayed on the electronic device 210 and the ACR system 220 can replace the media segment 280 with the overlay content segment 288, as discussed in greater detail in the proceeding paragraphs. The overlay content segment 288 can include frames 282-286. In one example, the overlay content segment 288 can be a replacement AD that the ACR system 220 overlays or superimposes on top of the frames 270-274 in the media segment 280. In one another, the overlay content segment 288 can be a replacement AD that the ACR system 220 replaces the frames 270-274 of media segment 280 with the frames 282-286. The number of frames and the number of media segments in media content are not intended to be limiting. For example, the media content 278 can include multiple media segments 280 that can have varying numbers of frames.

Figure 3:
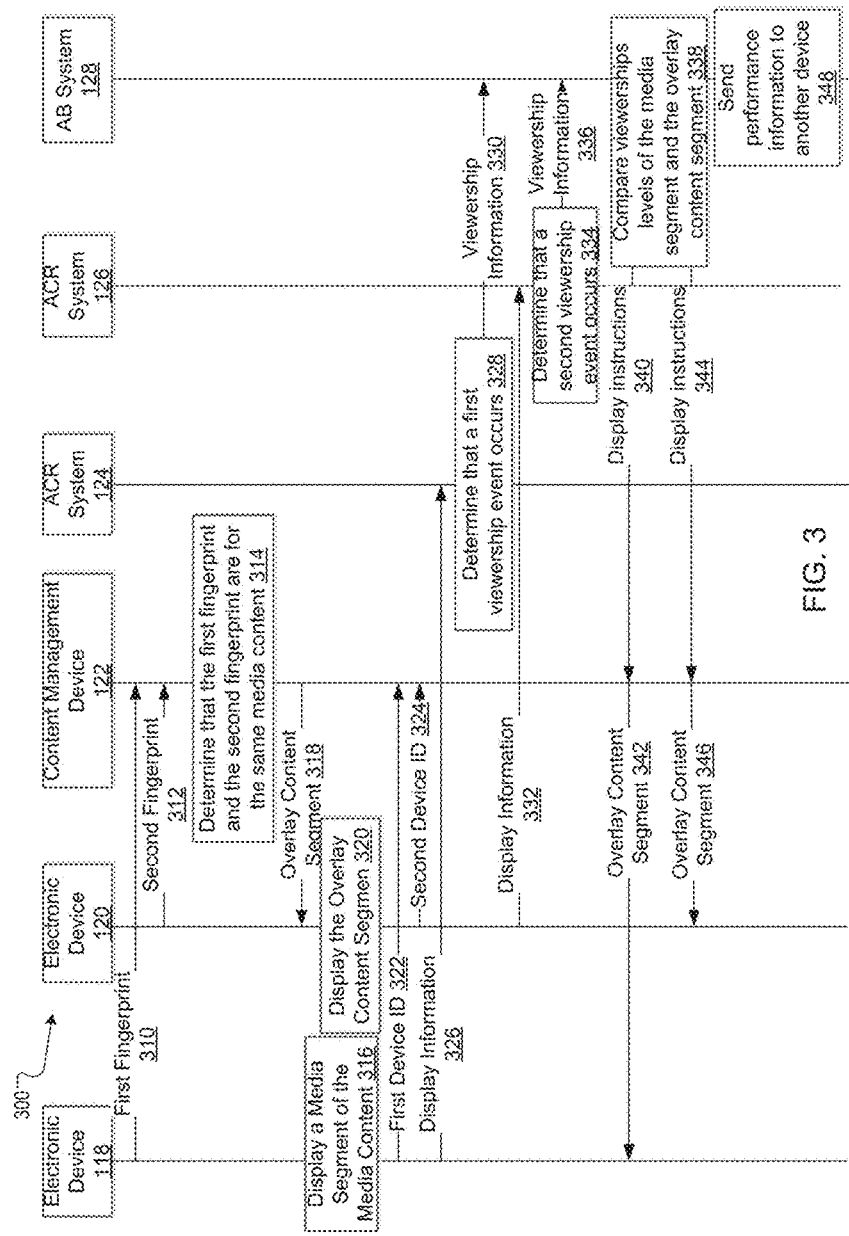
FIG. 3 illustrates a flowchart of a method for determining a media segment from a set of media segments to display to a viewer on an electronic device according to one embodiment.

FIG. 3 illustrates a flowchart of a method 300 for determining an overlay content segment from a set of overlay content segments to display to a viewer on an electronic device 120 according to one embodiment. The method 300 may at least partially be performed by processing logic that includes hardware (e.g., circuitry, dedicated logic, programmable logic, microcode, etc.), software (e.g., instructions executed by a processing device), firmware or a combination thereof. The method 300 may be performed by all or part of the content distribution network 100 of FIG. 1. For example, the method 300 may be performed by all or part of the processing logic of the automatic content recognition (ACR) system 124 or 126 or the electronic device 115 (FIG. 1). Some of the features in FIG. 3 are the same or similar to the some of the features in FIGS. 1, 2A, and 2B as noted by same reference numbers, unless expressly described otherwise.

Referring to FIG. 3, the method 300 begins with the electronic device 118 determining a first fingerprint for media content and sending the first fingerprint to the content management device 122 (310). The electronic device 118 may include a unique identifier (UID). The electronic device 118 can include an ACR system, where the electronic device 118 receives media content that includes multiple media segments from a content source device over a second network connection between the content source device and the electronic device 118. The ACR system of the electronic device 118 can generate the first fingerprint for a first media segment of the plurality of media segments. The content management device 122 can be connected to the electronic device 118 via a first network connection.

The method can include the electronic device 120 determining a second fingerprint for media content and sending the second fingerprint to the content management device 122 for the media content (312). The electronic device 120 can include an ACR system, where the electronic device 120 receives media content that includes multiple media segments from a content source device over a fourth network connection between the content source device and the electronic device 120. The ACR system of the electronic device 120 can generate the second fingerprint for the first media segment of the plurality of media segments. In one example, the content management device 122 can be connected to the electronic device 120 via a third network connection. The electronic device 120 can include a unique identifier (UID).

In another example, the ACR system integrated into the electronic device 118 can generate the first fingerprint and the ACR system integrated into the electronic device 120 can generate the second fingerprint, where the first and second fingerprints are generated from the media content (e.g., a media program or channel) viewers are watching. The content management device 122 can compare the first fingerprint or the second fingerprint with stored fingerprints within a database to determine a match. This database can be stored at a server (such as the reference database 125 or 127) coupled to the content management device 122. In one example, the content manger 122 can be an ACR server. The content management device 122 can query the database to identify one or more matches between the first fingerprint and/or second fingerprints and the stored fingerprints. When the content management device 122 finds a match between fingerprints, the content management device 122 can identify a channel that the media content (such as a TV program) is currently being streamed on or is going to be streamed on.

The method can include the content management device 122 determining that the first fingerprint and the second fingerprint are both for the same media content (314). To determine that the first fingerprint and the second fingerprint are each for the same media content, the content management device 122 can match each of the first fingerprint and the second fingerprint to a third fingerprint stored in a reference database coupled to the content management device 122.

The method can include the electronic device 118 displaying the media segment of the media content (316). For example, the media content can include a media segment. In one example, the media segment can be an AD that is integrated or embedded in the media content. In another example, the media segment can include non-commercial items such as news alerts, announcements, educational information, and so forth. In one embodiment, the media content can be for linear broadcast TV. In another embodiment, the media content can be for streaming media. The method can include the content management device 122 sending an overlay content segment to the electronic device 120 (318).

The media segment and the overlay content segment can include different content, such as different audio content, video content, graphical content, and so forth. In one example, the media segment can be a first video segment and the overlay content segment can be a second video segment, where the first video segment and the second video segment include different video content. In another example, the media content can be at least a portion a television show or a movie broadcast, the media segment can be a first commercial within the television show or the movie broadcast, and the overlay content segment can be a second commercial that is superimposed onto a portion of the television show or the movie broadcast or onto the media segment.

In one embodiment, electronic devices associated with different viewers can be separated into different groups to receive different media segments. For example, the electronic device 118 can be in a first group designated to receive the media segment embedded in the media content. In another example, the electronic device 120 can be in a second group designated to receive the overlay content segment to be overlayed or superimposed onto the media content. In one example, the overlay content segment can include elements to test for different objectives (such as generating leads or sales opportunities) or test inefficiencies in the media segment. The elements of the overlay content segment can include different audio content, video content, textual or graphical content, interactive content, and so forth. A variety of techniques are used to create different overlay content segments. In one example, separate overlay content segments, each with a specific combination of features or elements can be created. In another example, a baseline overlay content segment can be created that has dynamic elements that can be adjusted or changed.

In another example, when a content management device 122 determines that the first fingerprint and the second fingerprint are both for the media content, the content management device 122 determines when a segment testing event occurs. The segment testing event can be when a fingerprint of the media content matches a selected fingerprint in a reference database of the content distribution network 100. In one example, the selected fingerprint in the reference database can be a fingerprint preceding an AD. In another example, the selected fingerprint in the reference database can be a fingerprint at the beginning of an AD. When the fingerprint match is detected, the content management device 122 can send the overlay content segment to the electronic device 120 for display to a first viewer (318). The electronic device 118 can display the media segment that is part of the media content to a second viewer.

In one embodiment, the content management device 122 can send the overlay content segment to a first group of electronic devices and it can send the media segment to a second group of electronic devices. In another embodiment, the content management device 122 can send the overlay content segment to a portion of the first group of electronic devices and it can send the media segment to a remaining portion of the first group of electronic devices. In one example, the first group of electronic devices can be 50% of the electronic devices in a set of electronic device and the second group of electronic devices can be the remaining 50% of the electronic devices in the set of electronic device. In another example, the electronic devices in the first group or the second group can receive the media segment and overlay content segments randomly. In another example, the electronic devices in the first group and the second group can receive the media segment and overlay content segment using criteria to select the electronic devices. The criteria can include as demographic information or geographic information for the viewers associated with the electronic devices.

One or more electronic devices selected to receive the overlay content segment may not display the overlay content segment. An electronic device may not superimpose the overlay content segment over the media segment before the electronic device begins to display the media segment. For example, when the electronic device 120 has a slow internet connection, the overlay content segment may not be downloaded in time. The overlay content segment is loaded from the internet and the overlay content segment may not be requested in time for the content distribution network 100 or the electronic device 120 to superimpose the overlay content segment onto the media content before the media segment begins to be shown to the viewer. To preserve the user experience, the electronic device 120 may not show a partially loaded overlay content segment and the viewer will see the media segment as part of the normal broadcast.

The media content, the media segment, and the overlay content segment can have a variety of different formats. In one example, the media content can be taped or pre-recorded media content. In this example, the electronic device 120 can overlay or superimpose the overlay content segment on-demand. In one example, the electronic device 120 can overlay the overlay content segment onto the media content at a scheduled time. In another example, the electronic device 120 can overlay the overlay content segment onto the media content when a selected fingerprint of the media content is identified. An advantage of the electronic device 120 overlaying or superimposing the overlay content segment onto the taped or pre-recorded media content is that the overlay content segment can be stored or buffered in memory of the electronic device 120 to avoid issues with slow-internet download of the overlay content segment as discussed herein.

In another example, the media content can be a live media stream, such as a live event broadcast of a news event or a sporting event. In this example, to superimpose or overlay the overlay content segment onto the live media stream, a pre-determined ACR ID can be associated with the live media stream at the time the media stream is broadcast. The ACR ID is a unique identifier for the live media stream that is set in advance of the live event occurring and is used by the content distribution network 100 to set up comparison testing. When the live media stream is broadcast, the content distribution network 100 can instruct an ACR system to override the using of fingerprints to identify the media content and can assign the ACR ID to the live media stream.

An ACR system running at a head-end of a broadcaster can associate the pre-determined ACR ID with the live media stream when the live media stream begins to air. For example, the ACR ID can be used for the live media stream because when the media segment in the live media stream is to be replaced. The content distribution network 100 may not be able to ingest and fingerprint the video of the live stream using an ACR system in advance of the electronic device 120 displaying the video of the live stream. The ACR ID can be used to identify where to overlay the overlay content segment in the media content.

Alternatively, the live media stream may include a pre-recorded lead-in. The pre-recorded lead-in may be a show introduction or a show title. For example, while Monday night football may be broadcast or streamed as live media content, a "Monday Night Football" prerecorded title may be shown prior to showing ADs. When the live media stream includes the pre-recorded lead-in, the content distribution network 100 can ingest and fingerprint the pre-recorded lead-in and a timer can be used so that at a specific instance of the program, the timer can be started to indicate when to replace the overlay content segment.

In one embodiment, the electronic device 120 can continue to overlay the overlay content segment onto the media content when the live media stream changes from pre-recorded ADs shown in the media content, so long as the channel remains the same. For example, while the ACR system 126 can be executed on the electronic device 120, the ACR system 126 may not have access to notifications from the electronic device 120 that the live media content has changed, such as a breaking news alert or a shortened commercial break. The ACR system 126 may continue to display the overlay content segment when the live media content changes. In another embodiment, there is a delay or latency between the time the live media stream is broadcast and when the electronic device 120 receives and displays the live media content. The ACR system 126 can receive fingerprints during this latency period and can determine when the live media content changes because the received fingerprints do not match the fingerprints of the live media content being displayed. When the live media content changes, the electronic device can stop overlaying the media content with the overlay content segment.

In another embodiment, the media segment can be part of pre-recorded media content and the overlay content segment can be content from a live media stream. For example, the pre-recorded media content can be a regularly scheduled television show and the overlay content segment can be a breaking news live media stream. The ACR system 126 can match a selected fingerprint of the pre-recorded media content with a stored fingerprint in the database and overlay the live overlay content segment onto the media content. For example, to overlay the media content with a live overlay content segment when the fingerprints matches, a uniform resource locator (URL) of a hypertext transfer protocol live streaming (HLS) stream can be overlayed onto the pre-recorded media content.

In another embodiment, the media content can be part of a first live media stream and the overlay content segment can be a second live media stream. In this example, the ACR ID can be used to determine when to overlay the URL of the HLS stream onto the live media segment, as discussed in the preceding paragraphs.

The method can include the electronic device 120 displaying the overlay content segment (320). In one embodiment, the content management device 122 may send the overlay content segment to the electronic device 120. In another embodiment, the content management device 122 may send a message to the electronic device 120 instructing the electronic device 120 to display the overlay content segment that is stored at a memory device of the electronic device 120.

In one example, the electronic device 120 can be a smart TV. In another example, the electronic device 120 can be an AD server. The content management device 122 can send the media segment to the electronic device 118 and the overlay content segment to the electronic device 120 to target different viewers. In one example, the electronic device 118 can display the media segment to a first viewer and the electronic device 120 can display the overlay content segment to a second viewer by superimposing or overlaying the overlay content segment on top of the media content currently being displayed. In one example, the overlay content segment can be superimposed over the media segment currently being displayed to the viewer during a commercial break. In another example, the overlay content segment can be overlayed on top of the media segment during a commercial break. In another example, the overlay content segment can superimpose or overlay the media content currently being displayed to the viewer during a regularly scheduled program.

In another embodiment, media content with a second media segment can be sent to the electronic device 120. The second media segment can be displayed to the viewer rather than superimposing or overlaying the overlay content segment onto a first media segment. In one example, the electronic device 120 can be associated with a first viewer in a different demographic or geographic region than the electronic device 118 associated with a second viewer. In another example, the second viewer can be in a same demographic or geographic region as the first viewer of the electronic device 118. An advantage of displaying the media segment and the overlay content segment to viewers in the same geographic region or demographic is that content providers or advertisers can test an effectiveness of different media segments and overlay content segments without having to divide their watchers up by geographic location or demographic. The content providers or advertisers can also avoid introducing other variables, aside from the different media segments, that may influence a retention of a viewer. As discussed in the proceeding paragraphs, the media segment or overlay content segment that retain the viewers longer can cause more people to tune into the media content. The higher retention can increase viewership of the media content enable media content broadcasters to charge more money for AD spots.

The method can include the electronic device 118 sending a first device identifier (ID) to the content management device 122 (322). The first device ID can include information indicating that the electronic device 118 with a first unique identification number (UID) displayed the media segment. The method can include the electronic device 120 sending a second device identifier (ID) to the content management device 122 (324). The second device ID can include a second UID and information indicating that the electronic device 120 displayed the overlay content segment.

In one example, the AB system 128 or an overlay engine of the content distribution network 100 can generate a list of device IDs and the media segment or overlay content segments displayed by the electronic devices associated with the device IDs. The AB system 128 can be connected to the content management device 122 via a fifth network connection. For example, the list can include the first device ID for the electronic device 118 that displayed the media segment and the second device ID for the electronic device 120 that displayed the overlay content segment. In another example, the list can include media segment IDs associated with media segments, and overlay content segment IDs associated with overlay content segments. For example, the list can include: a first device ID and a media segment ID associated with the media segment displayed on a first device having the first device ID; and a second device ID and an overlay content segment ID associated having the overlay content segment displayed on a second device with the second device ID.

In another example, when part of a group of electronic devices display the media segment and another part of the group of electronic devices display the overlay content segment, the list can indicate which electronic devices in the group displayed the media segment and which electronic devices in the group displayed the overlay content segments, respectively.

The method can include the electronic device 118 sending first display information to the ACR system 124 (326). For example, the first display information can include fingerprints of the media segment displayed on the electronic device 118. In another example, the first display information can include command information for the electronic device 118. The command information can be information indicating when the electronic device 118 received a command from an input device to mute a volume of the electronic device 118, pause the media content, fast forward the media content, and so forth.

The method can include the ACR system 124 determining that a first viewership event has occurred at the electronic device 118 (328). A viewership event can include a channel changing of the electronic device 118, turning off of the electronic device 118, staying on a same channel on the electronic device 118, muting a volume of the electronic device 118, pausing the media content on the electronic device 118, fast forwarding the media content on the electronic device 118, and so forth.

The ACR system 124 can use the fingerprints to determine when the media content displayed on the electronic device 118 has changed (such as when the channel has changed). For example, the ACR system 124 can determine that the fingerprints received from the electronic device 118 are different than the stored fingerprints for the current media content, e.g., the received fingerprint is different than the stored fingerprint when a TV channel has been changed. In another example, the ACR system 124 can determine that the electronic device 118 has been turned off when the ACR system 124 ceases to receive fingerprints from the electronic device 118. The method can include the ACR system 124 sending first viewership information to the AB system 128 (330). The first viewership information can include behavioral information for the viewer or viewership events, as discussed below.

The method can include the electronic device 120 sending second display information to the ACR system 126 (332). The method can include the ACR system 126 determining that a second viewership event has occurred at the electronic device 120 (334). For example, the second display information can include fingerprints of the overlay content segment displayed on the electronic device 120. The ACR system 126 can use the fingerprints to determine when the media content with the overlay content segment overlay displayed on the electronic device 120 remained the same, where the channel was not changed by the viewer. For example, the ACR system 126 can determine that the fingerprints received from the electronic device 120 are the same as the stored fingerprints for the overlay content segment, e.g., the received fingerprints are the same as the stored fingerprint when a TV channel has not been changed.

The method can include the content management device 122 sending second viewership information to the AB system 128 (336). The second viewership information can include similar types of information as the first viewership information discussed in the preceding paragraphs. The method can include the AB system 128 comparing a viewership level of the media segment displayed on the electronic device 118 with a viewership level of the overlay content segment displayed on the electronic device 120 (338). The AB system 128 can compare the viewership level by comparing the first viewership information and the second viewership information. In one embodiment, the AB system 128 can determine that a viewership of the overlay content segment exceeds a viewership of the media segment. For example, the AB system 128 can compare the first viewership information with the second viewership information to determine that a first viewer of the electronic device 120 watched the entire overlay content segment while a second viewer of the electronic device 118 changed the channel when the media segment was displayed.

In another embodiment, the AB system 128 can determine a viewership level of the overlay content segment or the media segment using viewership events. The viewership events can include: the electronic device 118 or 120 receiving a request from an input device (such as a remote control) to change a broadcast channel displayed on the electronic device 118 or 120; the electronic device 118 or 120 receiving a request from the input device to turn off of the electronic device 118 or 120; the electronic device 118 or 120 receiving a request from the input device to mute a volume of the electronic device 118 or 120; the electronic device 118 or 120 receiving a request from the input device to pause the media content or the media segment displayed on the electronic device 118 or 120; or the electronic device 118 or 120 receiving a request from the input device to fast forward the media content or the media segment displayed on the electronic device 118 or 120. In one example, the AB system 128 can determine that the first viewership level is greater than a second viewership level by determining that a number of first viewership events associated with the overlay content segment is greater than a number of second viewership events associated with the media segment. In another example, the AB system 128 can determine that the first viewership level is greater than a second viewership level by determining that a number of first viewership events is at least one and a number of the second viewership events is zero.

In another example, the AB system 128 can determine whether there is a statistically significant difference in the viewership between the media segment and the overlay content segment. Viewership can be defined as a number of viewership events that occur while the electronic device 118 or 120 displays the media segment or overlay content segment. The statistically significant difference can be a threshold level difference between the viewership of the media segment and the overlay content segment. For example, the threshold level can be a 5% difference in the viewership. In this example, when the statistical difference in the viewership between the media segment and the overlay content segment does not exceed the threshold level, the difference may result by chance and not because of some underlying difference in the media segment and the overlay content segment.

In another example, a user can set the threshold level via a user interface, such as a graphical user interface (GUI) of the content management system 100. The threshold level can be a parameter that a user can set in view of how certain the user desires to be that the display of the media segment and the overlay content segments are causing the difference in viewership, and not just occurring by chance. In one embodiment, the AB system 128 can match a list of device IDs (as discussed in the preceding paragraphs) with a viewership of the media segment and the overlay content segments to determine whether there is a statistically significant difference in viewership between the media segment and the overlay content segments. An advantage of comparing the viewership of the media segment and the overlay content segments is to determine a degree to which the media segments and overlay content segments elicit specific user actions. In one example, the user actions can include a viewer retention, such as not triggering viewership events.

The method can include the AB system 128 sending a first display instruction to the content management device 122 instructing the content management device 122 to send the overlay content segment to the electronic device 118 for display (340). The method can include the content management device 122 sending the overlay content segment to the electronic device 118 for display (342). The method can include the AB system 128 sending a second display instruction to the content management device 122 instructing the content management device 122 to send the overlay content segment to the electronic device 120 for display (344).

The method can include the content management device 122 sending the overlay content segment to the electronic device 120 for display (346). In one embodiment, the comparing the viewership of the media segment and the overlay content segments can be done for a threshold period of time before the AB system 128 sends the display instructions (340 and 344). In another embodiment, the media segment and the overlay content segments can be displayed to a threshold number of viewers before the AB system 128 sends the display instructions to the electronic device 118 and the electronic device 120 (340 and 344). An advantage of sending the overlay content segment with the higher viewership to the electronic device 118 and the electronic device 120 for display can be to increase retention of viewers or increase a probability viewers will tune in to the media content.

The method can include the AB system 128 sending performance information to another device. In one example, the other device can be a device associated with a system administrator or a content provider (348). The performance information can include information indicating a first attention level of a first viewer while the media segment is displayed on the electronic device 118 and a second attention level of a second viewer while the overlay content segment is displayed on the electronic device 120.

In one embodiment, the AB system 128 may send the performance information to the other device when a difference between the first attention level and the second attention level exceeds a threshold attention level. For example, when the second attention level exceeds the first attention level by a threshold amount, the difference between the first attention level and the second attention level can indicate that the viewer prefers the overlay content segment over the media segment. When the viewer views the preferred overlay content segment, the viewer may be more likely to watch the overlay content segment and displaying the overlay content segment can increase a retention of viewers. In another example, the difference between the first attention level and the second attention level exceeding the threshold attention amount indicates a probability that an attention level of multiple viewers will be higher for the overlay content segment than for the media segment.

In one example, the A/B test of the media segment and the overlay content segment can be performed for a period of time or for a number of views, after which the results can be sent to the other device (348) and/or the display instructions can be sent to the electronic devices 118 and 120 (340 and 344). In one embodiment, the testing of viewership of different media segments can be continuous in order to determine, on an ongoing basis, which media segment has the highest viewership. For example, as the viewership of media segments and/or the overlay content segments changes, the AB system 128 can instruct the content management device 122 to send different overlay content segments to the electronic devices 118 and 120.

In one example, a news broadcast can include a media segment (such as a pre-recorded media segment) which will be part of a live linear TV broadcast. The news broadcast can also include an overlay content segment (such as a pre-recorded overlay content segment) of approximately the same length as the media segment, where the overlay content segment has a different style or is on a different subject. A news broadcast provider that broadcasts the news broadcast may desire to know whether the pre-recorded media segment or the pre-recorded overlay content segment best retains viewers, because more retained viewers equates to more people viewing ADs.

The news broadcaster can upload the media segment into the content distribution network 100 (FIG. 1) as part of a baseline media content broadcast. The news broadcaster can also upload the overlay content segment into the content distribution network 100 (FIG. 1) as part of a test broadcast. In this example, the media segment can be compared to the overlay content segment and/or a variety of other media segments. In one embodiment, the media segment can be inserted on the broadcast side and becomes part of the normal live broadcast and the overlay content segment can be inserted by the ACR system 124 or 126 on the electronic device 118 or 120, respectively. The AB system 128 can instruct the ACR system 124 or 126 to display the media segment and/or different overlay content segments.

In response to the results of comparing the media segment against the overlay content segment, the AB system 128 can superimpose a first overlay content segment that causes an increase response rates and attentiveness of viewers onto the current media content. After continuing to monitor the response rates and attentiveness of viewers, the AB system 128 can determine that a second overlay content segment causes an increase response rates and attentiveness of viewers and can superimpose the second overlay content segment onto future media content. In one example, different versions of the test overlay content segments may be compared to the baseline media content with the media segment to identify elements of the different overlay content segments that increase viewer response rates and attentiveness. For example, different variations of the test overlay content segments may be distributed to a variety of viewers. One advantage of testing the media content with different test overlay content segments is to provide advertisers, content providers, and broadcasters viewership and retention information to make marketing decisions. For example, users can upload different versions of overlay content segments or entirely different media content to a server to be broadcast to a viewer.

As an attentiveness level of the viewers is determined for different overlay content segments, the overlay content segments with the highest attentiveness level for the viewers can be selected for electronic devices to display to other viewers. Another advantage of testing the media content can be to determine whether a viewer has a moment of receptivity. The moment of receptivity is a period of time during which the viewer, in response to the media segment or overlay content segments, is likely to be receptive to receiving an offer. For example, the AB system 128 can use the attentiveness level of the viewer to determine when the viewer has a moment of receptivity for receiving an offer. The AB system 128 can instruct the content management device 122 to send a media segment or overlay content segment to an electronic device that the viewer will be receptive.

The electronic device 118, the electronic device 120, the content management device 122, the ACR system 124, the ACR system 126, and/or AB system 128 can be connected together by different network connections. For example, the sending data, information, overlay content segments, media content, media segments, ID information, and so forth, between the electronic device 118, the electronic device 120, the content management device 122, the ACR system 124, the ACR system 126, and/or AB system 128, as discussed above, can be done via one or more network connections. In one embodiment, a network connection can be a wired communication channel to communicate data, such as a communication channel via an Ethernet cable or a coaxial cable. In another embodiment, the network connection can be a wireless communication channel to communicate data, such as a cellular communication channel or a WLAN communication channel.

Figure 4:
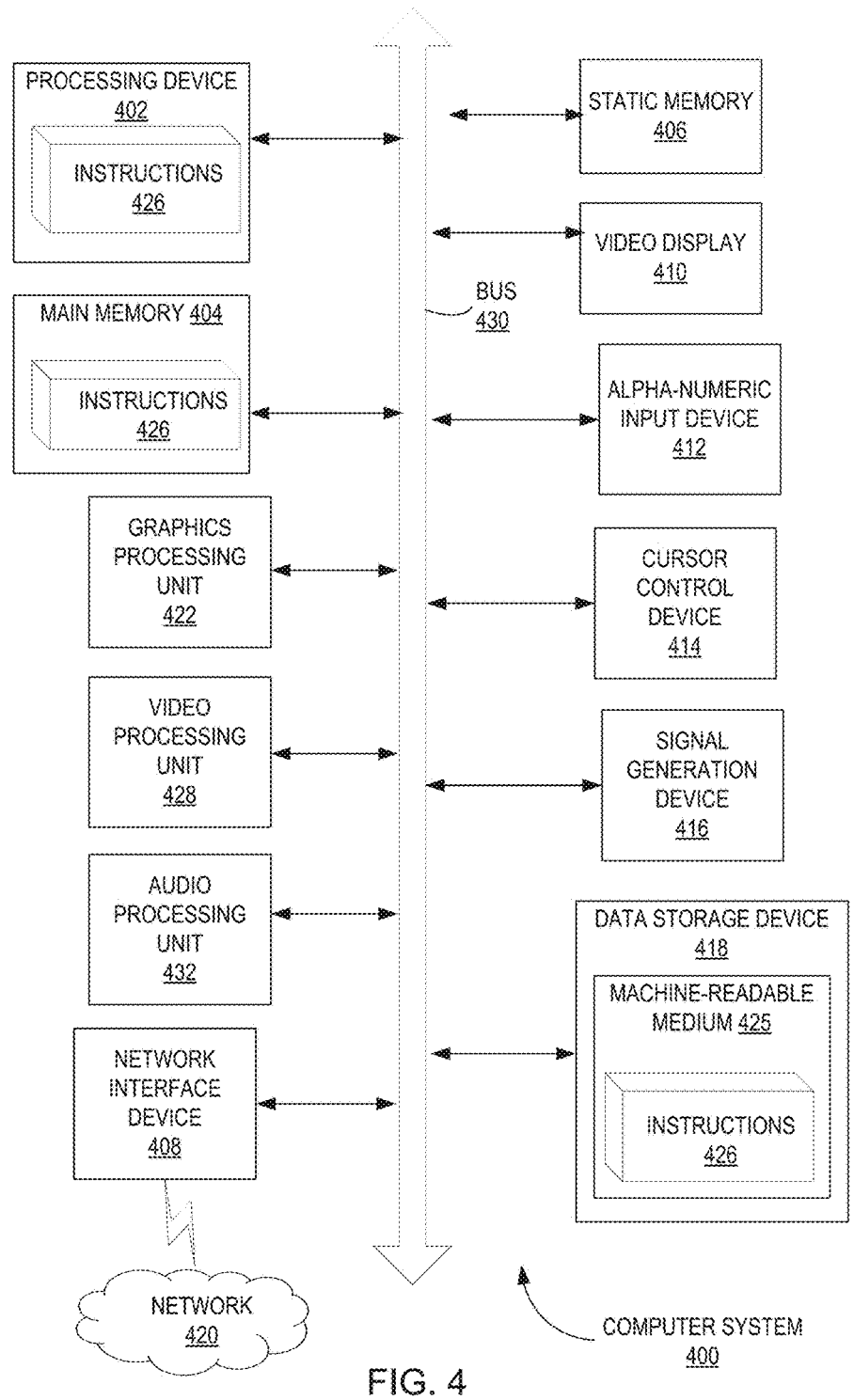
FIG. 4 schematically illustrates a block diagram of a system according to one embodiment.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or an electronic device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 400 may correspond to the ACR fingerprinter server 105 of FIG. 1. The computer system 400 may correspond to at least a portion of a cloud-based computer system.

The computer system 400 includes a processing device 402, a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 430.

Processing device 402 represents one or more processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. In one embodiment, processing device 402 may include one or more processing cores. The processing device 402 is configured to execute the instructions 426 of a mirroring logic stored in the main memory 404 for performing the operations discussed herein.

The computer system 400 may further include a network interface device 408 communicably coupled to a network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), a signal generation device 416 (e.g., a speaker), or other peripheral devices. Furthermore, computer system 400 may include a graphics processing unit 422, a video processing unit 428, and an audio processing unit 432. In another embodiment, the computer system 400 may include a chipset (not illustrated), which refers to a group of integrated circuits, or chips, that are designed to work with the processing device 402 and controls communications between the processing device 402 and external devices. For example, the chipset may be a set of chips on a motherboard that links the processing device 402 to very high-speed devices, such as main memory 404 and graphic controllers, as well as linking the processing device 402 to lower-speed peripheral buses of peripherals, such as USB, PCI or ISA buses.

The data storage device 418 may include a computer-readable storage medium 425 on which is stored instructions 426 embodying any one or more of the methodologies of functions described herein. The instructions 426 may also reside, completely or at least partially, within the main memory 404 and/or within the processing device 402 during execution thereof by the computer system 400; the main memory 404 and the processing device 402 also constituting computer-readable storage media.

The computer-readable storage medium 425 may also be used to store instructions 426 utilizing logic and/or a software library containing methods that call the above applications. While the computer-readable storage medium 425 is shown in an example embodiment to be a single medium, the term "computer-readable storage medium" or "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Although the embodiments may be herein described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, smartphones, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below.

Although the embodiments are herein described with reference to a processor or processing device, other embodiments are applicable to other types of integrated circuits and logic devices. Similar techniques and teachings of embodiments of the present invention may be applied to other types of circuits or semiconductor devices that may benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, and/or 16 bit data operations and may be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or electronic devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments described herein may also relate to an apparatus for performing the operations herein. This apparatus may be specially constructed for the required purposes, or it may comprise a computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various computing systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A system comprising:
a first network connection to a first automatic content recognition (ACR) system, the first ACR system configured to determine first viewership information of a media segment displayed on a first television, wherein media content comprises at least the media segment;
a second network connection to a second ACR system, the second ACR system configured to determine second viewership information of an overlay content segment displayed on a second television;

a third network connection to a content management device configured to store one or more overlay content segments, the one or more overlay content segments including the overlay content segment displayed on the second television;

a memory;

a processing device coupled to the memory, the first network connection, the second network connection, and the third network connection, the processing device configured to execute a content comparison engine, wherein the content comparison engine is configured to:

receive, via the first network connection, one or more first viewership events associated with the media segment;

receive, via the second network connection, one or more second viewership events associated with the overlay content segment;

determine a first viewership level based on the one or more second viewership events associated with the overlay content segment, the first viewership level indicating an attentiveness of a first viewer of the overlay segment;

determine a second viewership level based on the one or more first viewership events associated with the media segment, the second viewership level indicating an attentiveness of a second viewer of the media segment;

determine that the first viewership level exceeds the second viewership level by a viewership level threshold, the viewership level threshold indicating a comparative difference between the first viewership level at the second television and the second viewership level at the first television; and in response to the first viewership level exceeding the second viewership level by the viewership level threshold, send a display instruction to the content management device via the third network connection, the display instruction instructing the content management device to send the overlay content segment to the first television and the second television for display.

2. The system of claim 1, wherein the media segment is a first video segment and the overlay content segment is a second video segment and wherein the first video segment and the second video segment comprise different video content.

3. The system of claim 1, wherein:

the media content is at least a portion of media content of a television show or a movie broadcast, the media segment is a first commercial within the television show or the movie broadcast, and the overlay content segment is a second commercial that is superimposed onto a portion of the television show or the movie broadcast or onto the media segment.

4. The system of claim 1, wherein the first television is a first smart television and the second television is a second smart television, the first smart television comprising:

a first processing device operable to:

access online interactive media or on-demand streaming media using first radio frequency (RF) circuitry;

execute a first operating system (OS); and execute one or more applications; and the first RF circuitry comprising a first antenna configured to transmit data on the first network connection; and the second smart television comprising:

a second processing device operable to:

access online interactive media or on-demand streaming media using second radio frequency (RF) circuitry;

execute a second OS; and execute one or more applications; and the second RF circuitry comprising a second antenna configured to transmit data on the first network connection.

5. The system of claim 1, wherein:

the one or more first viewership events comprise:

the first television receiving a request from a first input device to a change a broadcast channel displayed on the first television;

the first television receiving a request from the first input device to turn off of the first television;

the first television receiving a request from the first input device to mute a volume of the first television;

the first television receiving a request from the first input device to pause the media content or the media segment displayed on the first television; and the first television receiving a request from the first input device to fast forward the media content or the media segment displayed on the first television; and the one or more second viewership events comprise:

the second television receiving a request from a second input device to change a broadcast channel displayed on the second television;

the second television receiving a request from the second input device to turn off the second television;

the second television receiving a request from the second input device to mute a volume of the second television;

the second television receiving a request from the second input device to pause of the overlay content segment displayed on the second television; and the second television receiving a request from the second input device to fast forward the overlay content segment displayed on the second television.

6. The system of claim 1, wherein the processing device is further configured to determine that a number of second viewership events is at least one and a number of the first viewership events is zero.

7. The system of claim 1, wherein the content comparison engine is further configured to receive an adjustable viewership level threshold from a user interface.

8. The system of claim 1, wherein determining that the first viewership level exceeds the second viewership level by a viewership level threshold comprises continuously monitoring the first viewership level and the second viewership to determine when the first viewership level exceeds the second viewership level by the viewership threshold.

9. The system of claim 8, wherein continuously monitoring further comprises continuously monitoring the first viewership level and the second viewership level until the first viewership level exceeds the second viewership level by the viewership level threshold for a threshold period of time.

10. A content management device comprising:

a first network connection to a first electronic device executing a first automatic content recognition (ACR) system, wherein the first electronic device is configured to receive media content that comprises a plurality of media segments from a content source device over a second network connection between the content source device and the first electronic device, wherein the first ACR system generates a first fingerprint for a first media segment of the plurality of media segments, and wherein the first electronic device comprises a first unique identifier (UID) identifying the first electronic device;

a third network connection to a second electronic device executing a second ACR system, wherein the second electronic device is configured to receive the media content from the content source device over a fourth network connection between the content source device and the second electronic device, wherein the second ACR system generates a second fingerprint for the first media segment of the plurality of media segments, and wherein the second electronic device comprises a second UID identifying the second electronic device;

a fifth network connection to a content comparison engine configured to:
  determine a first viewership level of the second electronic device, the first viewership level indicating an attentiveness of a first viewer of the second electronic device;
  determine a second viewership level of the first electronic device, the second viewership level indicating an attentiveness of a second viewer of the first electronic device; and
  determine that the first viewership level exceeds the second viewership level by a viewership level threshold, the viewership level threshold indicating a comparative difference between the first viewership level at the second electronic device and the second viewership level at the first electronic device; and a processing device coupled to the first network connection, the third network connection, and the fifth network connection, the processing device configured to:
  receive the first fingerprint for the media segment and the first UID from the first electronic device via the first network connection;
  receive the second fingerprint for the media segment and the second UID from the second electronic device via the third network connection;
  determine that the first fingerprint and the second fingerprint each corresponds to the first media segment;
  send an overlay content segment to the second electronic device for the second electronic device to superimpose onto the media segment;
  receive a display instruction from the content comparison engine via the fifth network connection in response to the content comparison engine determining that the first viewership level exceeds the second viewership level by the viewership level threshold, the display instruction instructing the content management device to send the overlay content segment to the first electronic device and the second electronic device;
  determine that the second electronic device received the overlay content segment of the display instruction based on the second UID of the second electronic device; and
  send the overlay content segment to the first electronic device to superimpose onto the first media segment.

11. The content management device of claim 10, wherein to determine that the first fingerprint and the second fingerprint each corresponds to the first media segment, the processing device is further configured to:
  match the first fingerprint to a third fingerprint stored in a reference database coupled to the content management device; and
  match the second fingerprint to the third fingerprint.

12. The content management device of claim 10, wherein:
  the media content is at least a portion of media content of a television show or a movie broadcast,
  the first media segment is a first commercial within the television show or the movie broadcast, and
  the overlay content segment is a second commercial that is superimposed onto a portion of the television show or the movie broadcast or onto the first media segment.

13. The content management device of claim 10, wherein the processing device is further configured to:
  receive the first UID from the first electronic device, the first device ID indicating that the first electronic device displayed the media segment; and
  receive the second UID from the second electronic device, the second device ID indicating that the second electronic device displayed the overlay content segment.

14. The content management device of claim 13, wherein the processing device is further configured to generate a list indicating a plurality of electronic devices that have displayed the first media segment or the overlay content segment, the list comprising device IDs, media segment IDs, and overlay content segment IDs, wherein the list comprises the first UID and a media segment ID associated with the media segment and the second UID and an overlay content segment ID associated with the overlay content segment.

15. The content management device of claim 10, wherein the first electronic device is a first smart television and the second electronic device is a second smart television,
  the first smart television comprising:
    a first processing device operable to:
      access online interactive media or on-demand streaming media using first radio frequency (RF) circuitry;
      execute a first operating system (OS); and
      execute one or more applications; and
    the first RF circuitry comprising a first antenna configured to transmit data on the first network connection; and
  the second smart television comprising:
    a second processing device operable to:
      access online interactive media or on-demand streaming media using second radio frequency (RF) circuitry;
      execute a second OS; and
      execute one or more applications; and
    the second RF circuitry comprising a second antenna configured to transmit data on the first network connection.

16. A non-transitory machine-readable storage medium having instructions that, when executed by a processing device, cause the processing device to:
  receive first viewership information for a media segment displayed on a first electronic device, the first viewership information comprising a first viewership event associated with the media segment, wherein media content comprises at least the media segment;
  receive second viewership information for an overlay content segment displayed on a second electronic device, the second viewership information comprising a second viewership event associated with the overlay content segment;

determine that a first viewership level for the overlay content segment is greater than a second viewership level for the media segment in view of the first viewership event or the second viewership event;

determine that the first viewership level exceeds the second viewership level by a viewership level threshold, the viewership level threshold indicating a comparative difference between the first viewership level at the second electronic device and the second viewership level at the first electronic device; and in response to the first viewership level exceeding the second viewership level by the viewership level threshold, send a display instruction to a content management device instructing the content management device to send the overlay content segment to the first electronic device and the second electronic device.

17. The non-transitory machine-readable storage medium of claim 16, wherein the processing device is further to determine a first attention level of a first viewer when the media segment is displayed on the first electronic device by determining a first amount of the one or more first viewership events and a second attention level of a second viewer when the overlay content segment is displayed on the second electronic device by determining a second amount of the one or more second viewership events, wherein:

the one or more first viewership events comprise:
the first electronic device receiving a request from a first input device to a change a broadcast channel displayed on the first electronic device;
the first electronic device receiving a request from the first input device to turn off of the first electronic device;
the first electronic device receiving a request from the first input device to mute a volume of the first electronic device;
the first electronic device receiving a request from the first input device to pause the media content or the media segment displayed on the first electronic device; and
the first electronic device receiving a request from the first input device to fast forward the media content or the media segment displayed on the first electronic device; and the one or more second viewership events comprise:
the second electronic device receiving a request from a second input device to change a broadcast channel displayed on the second electronic device;
the second electronic device receiving a request from the second input device to turn off the second electronic device;
the second electronic device receiving a request from the second input device to mute a volume of the second electronic device;
the second electronic device receiving a request from the second input device to pause of the overlay content segment displayed on the second electronic device; and
the second electronic device receiving a request from the second input device to fast forward the overlay content segment displayed on the second electronic device.

18. The non-transitory machine-readable storage medium of claim 17, wherein the processing device is further configured to send performance information to a third electronic device, and wherein the performance information indicates the first attention level of the first viewer while the media segment is displayed on the first electronic device and the second attention level of the second viewer while the overlay content segment is displayed on the second electronic device.

19. The non-transitory machine-readable storage medium of claim 18, wherein the processing device is further configured to the send the performance information to the third electronic device when a difference between the first attention level and the second attention level exceeds a threshold attention level.

20. The non-transitory machine-readable storage medium of claim 19, wherein the difference between the first attention level and the second attention level indicates a probability that an attention level of a plurality of viewers will be higher for the overlay content segment than for the media segment.

* * * * *